United States Patent Office 3,391,220
Patented July 2, 1968

3,391,220
HYDROISOMERIZATION PROCESS WITH HEXANE ADDITION TO THE REACTION ZONE
Vladimir Haensel, Hinsdale, Ill., assignor to Universal Oil Products Company, Des Plaines, Ill., a corporation of Delaware
No Drawing. Filed Apr. 30, 1965, Ser. No. 452,344
6 Claims. (Cl. 260—683.76)

ABSTRACT OF THE DISCLOSURE

In the hydroisomerization of a $C_4$ or $C_5$ paraffin in the presence of $H_2$, a supported Pt group metal-combined halogen isomerization catalyst, and a hydrogen halide or alkyl halide promoter, the addition to the hydroisomerization reaction zone of a small amount of hexane acts to decrease the amount of promoter necessary in the reaction.

---

This invention relates to the hydroisomerization of isomerizable hydrocarbons and is more specifically concerned with an improvement in such a process when hydroisomerizing a hydrocarbon in the presence of hydrogen and a catalyst comprising a refractory oxide, combined halogen and a metal component selected from the metals and compounds of the metals of the platinum group and a halogen-containing compound as a hydroisomerization reaction promoter.

I have found that when utilizing, for example, a catalyst comprising alumina, combined halogen and platinum in the hydroisomerization of normal butane and normal pentane, greater amounts of a promoter such as an alkyl halide are required than when hydroisomerizing normal hexane. This is due to the fact that in the propagation of the reaction, the chains for the normal butane reaction are much shorter than for the normal hexane; that is, the number of molecules activated by a single alkyl halide is smaller in the case of normal butane than in the case of normal hexane. The present invention provides for a reduction of the required amount of halogen-containing compound, particularly alkyl halide, by the use of small amounts of a hexane being added to the hydroisomerization reaction zone in order to extend the chain propagation of the reaction. In this manner, the halogen-containing compound requirement is reduced by as much as threefold.

Therefore, it is an object of my invention to provide an improvement in the hydroisomerization process so as to decrease the amount of hydroisomerization reaction promoter necessary for the hydroisomerization reaction.

Another object of my invention is to provide an improvement in the hydroisomerization process so as to provide a more controllable hydroisomerization reaction.

In one embodiment, my invention relates to an improvement in a process for the hydroisomerization of an isomerizable hydrocarbon feed at hydroisomerization conditions in the presence of hydrogen and a catalyst comprising a refractory oxide, combined halogen and a metal component selected from the metals and compounds of the metals of the platinum group, and a halogen-containing compound as a hydroisomerization reaction promoter, the improvement which comprises adding to the hydroisomerization reaction zone a hexane in an amount of from about 0.1 to about 5 weight percent of said isomerizable hydrocarbon feed for decreasing the amount of promoter necessary in the reaction.

In a more specific embodiment, my invention relates to an improvement in a process for the hydroisomerization of an isomerizable hydrocarbon feed at hydroisomerization conditions including a temperature in the range of from about 100° F. to about 600° F. and a pressure in the range of from about atmospheric to about 200 atmospheres in the presence of hydrogen and a catalyst comprising a refractory oxide, combined halogen and a metal component selected from the metals and compounds of the metals of the platinum group, and an alkyl halide as a hydroisomerization reaction promoter, the improvement which comprises adding to the hydroisomerization reaction zone a hexane in an amount of from about 0.1 to about 5 weight percent of said isomerizable hydrocarbon feed for decreasing the amount of promoter necessary in the reaction.

A further specific embodiment of my invention relates to an improvement in a process for the hydroisomerization of normal butane at hydroisomerization conditions including a temperature in the range of from about 100° F. to about 600° F. and a pressure in the range of from about atmospheric to about 200 atmospheres in the presence of hydrogen and a catalyst comprising alumina, combined halogen and platinum, and an alkyl halide as a hydroisomerization reaction promoter, the improvement which comprises adding to the hydroisomerization reaction zone normal hexane in an amount of from about 0.1 to about 5 weight percent of said isomerizable hydrocarbon feed for decreasing the amount of promoter necessary in the reaction.

Another specific embodiment of my invention relates to an improvement in a process for the hydroisomerization of normal pentane at hydroisomerization conditions including a temperature in the range of from about 100° F. to about 600° F. and a pressure in the range of from about atmospheric to about 200 atmospheres in the presence of hydrogen and a catalyst comprising alumina, combined halogen and platinum, and an alkyl halide as a hydroisomerization reaction promoter, the improvement which comprises adding to the hydroisomerization reaction zone normal hexane in an amount of from about 0.1 to about 5 weight percent of said isomerizable hydrocarbon feed for decreasing the amount of promoter necessary in the reaction.

Other objects and embodiments of this invention will become apparent in considering the specification as hereinafter set forth.

As set forth hereinabove, the present invention is concerned with an improvement in a process for the hydroisomerization of an isomerizable hydrocarbon feed. The improvement of this invention is particularly applicable to the conversion of saturated hydrocarbons including both paraffins and cycloparaffins. Suitable paraffin hydrocarbons are those containing at least four carbon atoms per molecule including normal butane, isobutane, normal pentane, isopentane, etc., and cycloparaffins such as the alkyl cyclopentanes and cyclohexanes including methylcyclopentane, dimethylcyclopentane, methylcyclohexane, etc. The process is also applicable to the conversion of mixtures of paraffins such as those derived by fractionation of straight-run or natural gasolines or in the raffinate produced by extraction of aromatics from a hydroformed naphtha.

The hydroisomerization operating conditions maintained in my improved process, when it is desired to produce hydroisomerized hydrocarbons from lower boiling saturated isomerizable hydrocarbons, should be such that substantial conversion of straight chain paraffins to their more highly branched isomers is induced. The reaction temperatures ordinarily will lie within the range of from about 100° F. to about 600° F. and a pressure of from about atmospheric to about 200 atmospheres may be utilized. The hydrogen to hydrocarbon mole ratio will be in the range of from about 0.1 to about 10.0. The liquid hourly space velocity, defined as the volume of hydrocarbon charged per hour per volume of catalyst in the reaction zone will be in the range of from about 0.5 to about 25 or more, although liquid hourly space velocities from about 1 to about 15 are preferred.

Various catalysts are utilizable within the generally broad scope of the improved process of the present invention. These catalysts, as described in the prior art, include a support, an acid-acting function, and a hydrogenation component. The support may be selected from various diverse refractory oxides including silica, alumina, silica-alumina, silica-alumina-magnesia, silica-alumina-zirconia, silica-zirconia, etc. Depending upon the method of preparation and upon the treatment of the support thereafter, the support will have surface areas ranging from about 25 to about 500 square meters per gram. In some of the supports, the acid-function is inherently present, as when silica-alumina is used as the support. The amount of effectiveness of the acid-function is then controlled by the treatment of the silica-alumina, particularly by calcination, prior to or after compositing the hydrogenation component therewith. Of the various supports, alumina is preferred, and particularly gamma-alumina having a surface area of from about 130 to about 450 square meters per gram. When gamma-alumina is utilized as the support, the acid-function can be added to the catalyst by the incorporation therein of what is known in the art as combined halogen. The amount of combined halogen can be varied from about 0.01 to about 8% by weight based on the alumina. Of the various halogens which may be utilized, both fluorine and chlorine can be utilized satisfactorily. Thus, a suitable alumina-type catalyst to be utilized in the process of the present invention may comprise about 0.3% by weight of fluorine and about 0.3% by weight of chlorine incorporated therein.

Another suitable catalyst for use in the process of the present invention would comprise an alumina-type catalyst where the combined halogen incorporated with the alumina support is fluorine, and this fluorine may be utilized in an amount of from about 2.5% to about 4.5% by weight. Similarly, another suitable catalyst for use in the process of this invention would comprise an alumina-type catalyst where the combined halogen incorporated with the alumina support is chlorine, and this chlorine may be utilized in an amount of usually less than about 8% by weight. The composite will then have the desired hydrogenation component combined therewith as hereinafter described. This hydrogenation component will normally be selected from the metals and compounds of the metals of the platinum group including platinum, palladium, ruthenium, rhodium, osmium, and iridium. Of the various metal hydrogenation components which may be utilized, those of the platinum group metals are preferred, and of these platinum group metals, platinum itself is particularly preferred. The hydrogenation component of the catalyst will normally be utilized in an amount of from about 0.01% to about 10% by weight based on the weight of the support. With the preferred platinum group metals, particularly platinum, the quantity utilized will usually range from about 0.01% to about 2% by weight. A typical catalyst comprising platinum, combined halogen and alumina for use in the improved process of this invention therefore will contain about 0.375% platinum, about 5% combined chlorine and alumina.

As set forth hereinabove, a halogen-containing compound is utilized as a reaction promoter in the hydroisomerization reaction. Suitable halogen-containing compounds include the hydrogen halides and the alkyl halides. Suitable hydrogen halides include hydrogen chloride, hydrogen bromide and hydrogen iodide. Suitable alkyl halides include ethyl chloride, n-propyl chloride, isopropyl chloride, n-butyl chloride, isobutyl chloride, sec-butyl chloride, tert-butyl chloride, etc., ethyl bromide, n-propyl bromide, isopropyl bromide, n-butyl bromide, isobutyl bromide, sec-butyl bromide, tert-butyl bromide, etc. The utilization of a particular hydrogen halide or a particular alkyl halide will depend in part upon the catalyst system employed in the hydro-isomerization reaction and the feed stock to be isomerized. When the catalyst, for example, comprises alumina, combined chlorine and platinum, as set forth hereinabove, a preferred mode of operation without utilizing the improvement of the present invention comprises utilizing an alkyl halide, and the preferred alkyl halide is isopropyl chloride, usually in an amount of from about 0.0001 weight percent (one part per million, weight) to about 0.02 weight percent (200 parts per million, weight) of the isomerizable hydrocarbon feed.

As set forth hereinabove, the improvement of the present invention comprises utilizing a hexane including normal hexane and isomers thereof in an amount of from about 0.1 to about 5 weight percent of the isomerizable hydrocarbon feed as chain propagation extending means. The likely course and mechanism of the hydroisomerization reaction is believed to be a series of chain starting, chain propagation and chain termination reactions. As stated hereinabove, it has been observed that in the hydroisomerization of normal butane with the catalysts described hereinabove, the addition of greater amounts of a hydroisomerization reaction promoter such as an alkyl chloride are necessary than when isomerizing normal hexane, for example. This is due to the fact that in the propagation of the reaction, the chains for the normal butane reaction are much shorter than for the normal hexane. In other words, the number of molecules activated by a single alkyl chloride is smaller in the case of normal butane than in the case of normal hexane. By the improvement of the present invention, the required amount of alkyl halide necessary for promoting the hydroisomerization reaction is significantly reduced by the use of a hexane as the chain propagation reaction extending means and more molecules will be activated by the alkyl chloride as compared to the case where normal butane alone is being hydroisomerized. In this manner, the chain propagation reaction is actually extended because of the availability of the longer chain hexane that is present in the process of the present invention. At the same time, the quantity of halogen-containing compound utilized as the hydroisomerization reaction promoter is reduced since less molecules of promoter are necessary to promote the hydroisomerization reaction and to produce the necessary supply of carbonium ions for the exchange reaction with the normal hexane to produce the desired hydroisomerized product. Also, the extent of losses of the carbonium ion through reactions other than chain propagation is minimized by the use of smaller amounts of hydroisomerization reaction promoter and good hydroisomerization conversions are obtained by the improvement of the present invention.

One method of adding the hexane chain propagation reaction extending means to the hydroisomerization zone is to commingle it with the hydrocarbon charging stock passing thereto. Another method is to add the hexane chain propagation reaction extending means to the hydroisomerization zone simultaneously with but independently of said isomerizable hydrocarbon feed. Still another method is to add the hexane chain propagation reaction extending means to the hydrogen-rich gas passing to the hydroisomerization reaction zone. In any of these methods, the unused hexane fraction, if any, may subsequently be recovered by, for example, fractionation, and then be recycled to the reactor for further use.

The improvement of the present invention may be effected in any suitable manner, and is applicable to either a batch or continuous type operation. A particularly preferred application comprises a fixed bed-type operation where the conversion catalyst is disposed as a fixed bed within the reaction zone. Other continuous types of operation which may incorporate the improvement of the present invention include the compact moving bed-type of operation in which the bed of catalyst and the reactants pass either concurrently or counter-currently to each in the reaction zone, and the slurry type operation in which the catalyst is carried into the reaction zone as a slurry in one of the reactants.

The improvement of the present invention is readily demonstrated by the following examples which are introduced to further illustrate the novelty and utility of the present invention but not with the intention of unduly limiting the same.

Example I

A substantially anhydrous, sulfur-free, normal butane hydrocarbon feed stock was utilized and this feed stock was processed over a catalyst comprising 0.375 weight percent platinum, 5.17 weight percent combined chlorine, and an alumina support. To establish a base case, the plant was operated at conditions of about 392° F., 500 p.s.i.g. pressure, a liquid hourly space velocity of about 4.0, and a hydrogen to hydrocarbon mole ratio of about 1:1, without any hydroisomerization reaction promoter added to the hydroisomerization reactor.

Rapid deactivation of the hydroisomerization catalyst was observed and the conversion rate of normal butane to isobutane decreased to a relatively small amount within 20 hours of startup. The plant was then shut down and a fresh batch of the same catalyst was loaded into the same plant.

At the same operating conditions and with the same charge stock, but with isopropyl chloride added to the normal butane feed in amounts ranging from about 0.0001 weight percent of the normal butane (one part per million, weight) to about 0.02 weight percent of the normal butane (200 parts per million, weight) as the hydroisomerization reaction promoter, it was found that the normal butane to isobutane average conversion rose to about 46 weight percent at the 200 parts per million promoted level. Significantly lower conversions were obtained at promoter additions of less than about 100 parts per million.

With all operating conditions remaining constant, normal hexane as chain propagation reaction extending means was added to the hydroisomerization reaction zone by commingling about 3 weight percent (of the isomerizable hydrocarbon feed) normal hexane passing to the reaction zone. At the same time, the hydroisomerization reaction promoter was slowly backed out of the plant until less than 60 parts per million, weight isopropyl chloride were being added as the hydroisomerization reaction promoter. Normal butane to isobutane average conversions of about 46 weight percent were subsequently recorded which indicates that by extending the chain propagation reaction, the requirement of 200 parts per million, weight of hydroisomerization reaction promoter was vastly reduced without lessening the high conversion level of normal butane to isobutane and without causing reactions other than chain propagation.

Example II

Similar results are also obtained when normal pentane is isomerized over the hydroisomerization catalyst of the type described hereinabove. It is observed that a hexane chain propagation reaction means provides a good yield of isomerized product without the addition of large amounts of hydroisomerization reaction promoter in the form of isopropyl chloride. The normal hexane chain propagation reaction extending means provided good yields of isomerized product with this feed stock at hydrogen to hydrocarbon mole ratios of from about 1.0 to about 10.0 with best results and highest yields occurring at hydrogen to hydrocarbon mole ratios of from about 1.0 to about 6.0 with the addition of from about 1.5 to about 3.5 weight percent (of the normal pentane) normal hexane being added as the chain propagation reaction extending means.

I claim as my invention:

1. In combination with a process for the hydroisomerization of an isomerizable hydrocarbon feed selected from the group consisting of $C_4$ and $C_5$ paraffins at hydroisomerization conditions in the presence of hydrogen and a catalyst comprising a refractory oxide, combined halogen and a metal component selected from the metals and compounds of the metals of the platinum group, and a halogen-containing compound selected from the group consisting of hydrogen halide and alkyl halide as a hydroisomerization reaction promoter, the improvement which comprises adding to the hydroisomerization reaction zone a hexane in an amount of from about 1.5 to about 5 weight percent of said isomerizable hydrocarbon feed for decreasing the amount of promoter necessary in the reaction.

2. In combination with a process for the hydroisomerization of an isomerizable hydrocarbon feed selected from the group consisting of $C_4$ and $C_5$ paraffins at hydroisomerization conditions including a temperature in the range of from about 100° F. to about 600° F. and a pressure in the range of from about atmospheric to about 200 atmospheres in the presence of hydrogen and a catalyst comprising a refractory oxide, combined halogen and a metal component selected from the metals and compounds of the metals of the platinum group, and an alkyl halide as a hydroisomerization reaction promoter, the improvement which comprises adding to the hydroisomerization reaction zone a hexane in an amount of from about 1.5 to about 5 weight percent of said isomerizable hydrocarbon feed for decreasing the amount of promoter necessary in the reaction.

3. The improvement of claim 2 further characterized in that said hexane is added to the hydroisomerization zone by being commingled with said isomerizable hydrocarbon feed.

4. The improvement of claim 2 further characterized in that said hexane is added to the hydroisomerization zone simultaneously with but independently of said isomerizable hydrocarbon feed.

5. In combination with a process for the hydroisomerization of normal butane at hydroisomerization conditions including a temperature in the range of from about 100° F. to about 600° F. and a pressure in the range of from about atmospheric to about 200 atmospheres in the presence of hydrogen and a catalyst comprising alumina, combined halogen and platinum, and an alkyl halide as a hydroisomerization reaction promoter, the improvement which comprises adding to the hydroisomerization reaction zone normal hexane in an amount of from about 1.5 to about 5 weight percent of said isomerizable hydrocarbon feed for decreasing the amount of promoter necessary in the reaction.

6. In combination with a process for the hydroisomerization of normal pentane at hydroisomerization conditions including a temperature in the range of from about 100° F. to about 600° F. and a pressure in the range of from about atmospheric to about 200 atmospheres in the presence of hydrogen and a catalyst comprising alumina, combined halogen and platinum, and an alkyl halide as a hydroisomerization reaction promoter, the improvement which comprises adding to the hydroisomerization reaction zone normal hexane in an amount of from about 1.5 to about 5 weight percent of said isomerizable hydrocarbon feed for decreasing the amount of promoter necessary in the reaction.

References Cited

UNITED STATES PATENTS

| | | | |
|---|---|---|---|
| 2,332,577 | 10/1943 | Kassel | 260—683.68 |
| 2,342,923 | 2/1944 | Danforth | 260—683.68 |
| 2,908,735 | 10/1959 | Haensel | 260—683.68 |
| 3,060,249 | 10/1962 | Wise | 260—683.75 |
| 3,131,235 | 4/1964 | Asselin | 260—683.68 |

FOREIGN PATENTS

| | | |
|---|---|---|
| 559,426 | 2/1944 | Great Britain. |
| 899,378 | 6/1962 | Great Britain. |
| 688,484 | 6/1964 | Canada. |

DELBERT E. GANTZ, *Primary Examiner.*

G. J. CRASANAKIS, *Assistant Examiner.*